June 21, 1966  P. ABRAMSON ETAL  3,257,569
PULSE GENERATOR
Filed Nov. 19, 1963  3 Sheets-Sheet 1

INVENTORS
PAUL ABRAMSON
PAO H. CHIN
BY John J. Goodwin
ATTORNEY

June 21, 1966

3,257,569
PULSE GENERATOR
Paul Abramson, Yorktown Heights, and Pao H. Chin,
Pleasantville, N.Y., assignors to International Business
Machines Corporation, New York, N.Y., a corporation
of New York
Filed Nov. 19, 1963, Ser. No. 324,720
10 Claims. (Cl. 307—106)

The present invention relates to apparatus for generating a sequence of electrical pulses and more particularly to a pulse generator for generating a sequence of pulses having predetermined pulse spacing.

In many instances it is desirable to generate a sequence of pulses wherein the pulse to pulse spacing may either be uniform or nonuniform. In particular, there are many uses for a pulse generator capable of producing pulses on separate output lines, where the pulses are spaced in time and where the time spacing of the pulses may be varied as desired. The pulses from such separate output lines may be utilized as such, or the output lines may be connected together to provide a pulse train output wherein the spacing of the individual pulses may be adjusted or varied.

It is an object of the present invention to provide an improved pulse generator for producing a sequence of pulses having predetermined pulse to pulse spacing.

Another object of the present invention is to provide a pulse generator for producing a sequence of pulses without the use of moving parts.

Another object of the present invention is to provide a pulse generator wherein the pulse to pulse spacing of the generated pulses may be adjusted.

The foregoing and other objects, features and advantages of the invention will be apparent from the following more particular description of a preferred embodiment of the invention, as illustrated in the accompanying drawings.

Figure 1:
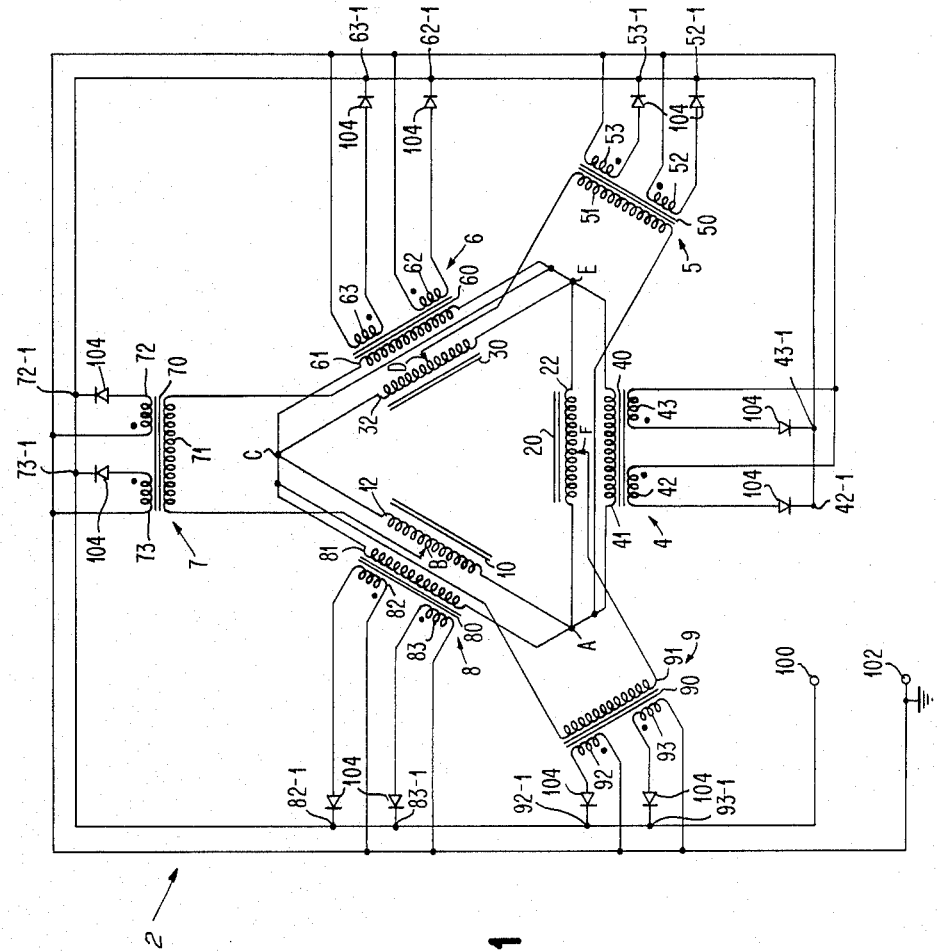
FIG. 1 is an embodiment of a pulse generator according to the principles of the present invention.

Referring to FIG. 1, a pulse generator is shown including a primary 1 and secondary 2 of a transformer. The primary 1 includes three primary windings 11, 21 and 31 connected in wye and connected to a source of three phase signal (not shown). The secondary 2 includes three secondary windings 12, 22 and 32 connected in delta. Windings 11 and 12; windings 21 and 22; and windings 31 and 32 are respectively wound on common cores 10, 20 and 30. One end of secondary winding 12 is connected to one end of secondary winding 22 at junction A; the other end of secondary winding 22 is connected to one end of secondary winding 32 at junction E, and the other end of secondary winding 32 is connected to the other end of secondary winding 12 at junction C.

Six pulse transformers 4, 5, 6, 7, 8 and 9 are connected to secondary 2. Pulse transformer 4 includes a primary winding 41 and secondary windings 42 and 43 wound on a common core 40; pulse transformer 5 includes a primary winding 51 and secondary windings 52 and 53 wound on a common core 50; pulse transformer 6 includes a primary winding 61 and secondary windings 62 and 63 wound on a common core 60; pulse transformer 7 includes primary winding 71 and secondary windings 72 and 73 wound on a common core 70; pulse transformer 8 includes a primary winding 81 and secondary windings 82 and 83 wound on a common core 80; and pulse transformer 9 includes a primary winding 91 and secondary windings 92 and 93 wound on a common core 90.

The cores 40, 50, 60, 70, 80 and 90 are saturated; that is, when a sinusoidal signal is applied to the primary thereof, the only output signal produced by a secondary thereof is a sharp pulse occurring when the sinusoidal signal changes polarity. Generally, a positive to negative polarity change of current in the core results in a sharp, negative voltage pulse and a negative to positive current change results in a positive voltage pulse.

Primary winding 41 is connected between junctions A and E; primary winding 51 is connected between junction A and a slidable connection D on winding 32; primary winding 61 is connected between junction E and junction C; primary winding 71 is connected between junction E and a slidable connection B on winding 12; primary winding 81 is connected between junctions C and A; and primary winding 91 is connected between junction C and a slidable connection F on winding 22.

For purposes of explanation, although not strictly required, the secondary windings of each pulse transformer are oppositely wound. Thus, windings 42, 52, 62, 72, 82 and 92 are wound in one direction and windings 43, 53, 63, 73 and 83 are wound in the opposite direction.

Figure 2:
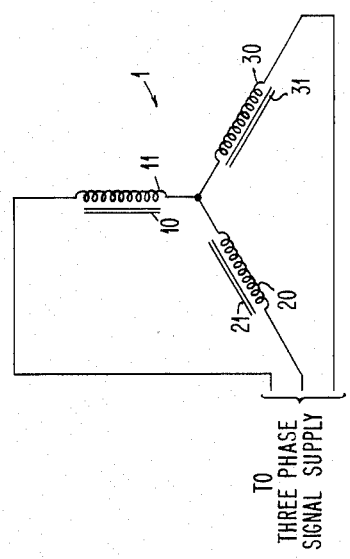
FIG. 2 is a vector diagram of the voltage relationship between various junctions of the structure of FIG. 1.
Figure 3:
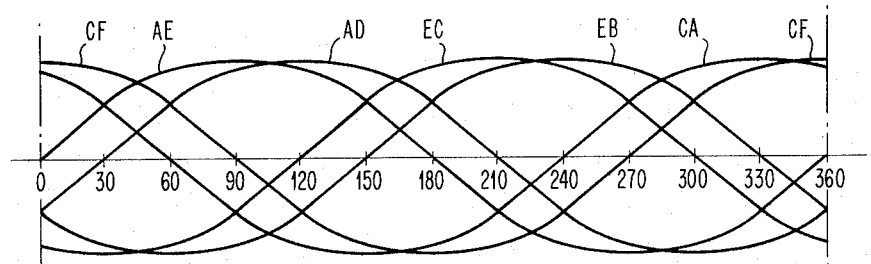
FIG. 3 is a waveform diagram of the voltage relationship between various junctions of the structure of FIG. 1.

In operation, the three phase signal applied to primary 1 is coupled via cores 10, 20 and 30 to secondary windings 12, 22 and 32. Consider that slidable connections B, D and F are positioned at the mid-points of secondary windings 12, 22 and 32, respectively. In such instance, the magnitude and direction of the voltages between the junctions A, B, C, D, E and F are shown vectorially in FIG. 2. In FIG. 3, the waveform of the voltages represented in FIG. 2 are shown (presuming slidable connections B, D and F are at the mid-points of their associated windings).

Referring to FIG. 3, it is seen that one of the voltage waveforms changes polarity (i.e., crosses the zero axis) every 30 degrees and that two positive going changes are followed by two negative going changes and vice versa. Waveform AE represents the voltage across pulse transformer primary 41, waveform AD is the voltage across pulse transformer primary 51, EC is the waveform of the voltage across pulse transformer primary 61, EB is the waveform of the voltage across pulse transformer primary 71, CA is the waveform of the voltage across pulse transformer primary 81, and CF is the waveform of the voltage across pulse transformer primary 91.

Assume that a positive going polarity change in the appropriate primary windings will produce positive voltage pulses in secondary windings 42, 52, 62, 72, 82 and 92 and negative going polarity changes produce negative voltage pulses therein. Therefore, positive going polarity changes in the appropriate primary windings produce negative voltage pulses in secondary windings 43, 53, 63, 73, 83 and 93 and negative going polarity changes will produce positive voltage pulses therein.

Figure 4:
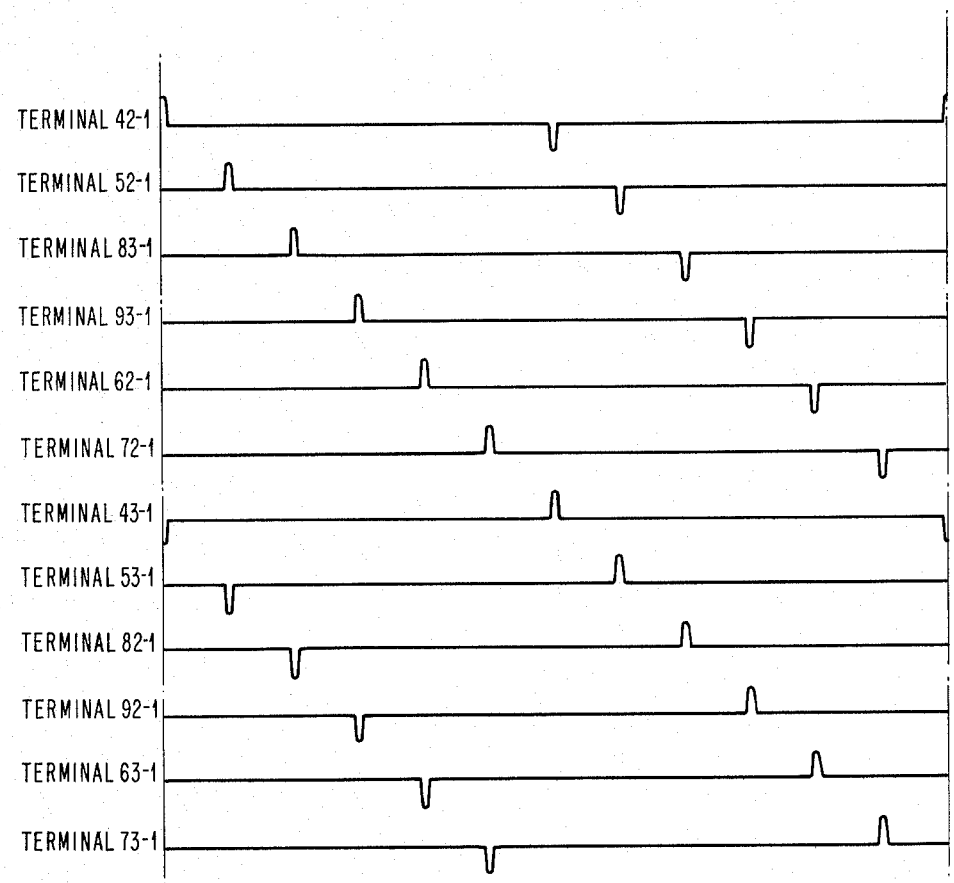
FIG. 4 is an illustration of output pulses obtainable with the structure of FIG. 1.

FIG. 4 illustrates the output voltage pulses produced by each of the pulse transformer secondary windings 42, 43, 52, 53, 62, 63, 72, 73, 82, 83, 92 and 93 and which appear respectively at terminals 42–1, 43–1, 52–1, 53–1, 62–1, 63–1, 72–1, 73–1, 82–1, 83–1, 92–1 and 93–1. In FIG. 4 it is seen that a positive pulse is produced in winding 42 and a negative pulse is produced in winding 43 by voltage AE crossing the zero axis in a positive direction at zero degrees (FIG. 3). Likewise, voltage AD crossing the zero axis in a positive direction at 30 degrees results in a positive voltage pulse from winding 52 and a negative pulse from winding 53; voltage CA crossing the zero axis in a negative direction at 60 degrees results in a positive pulse from winding 83 and a negative pulse from winding 82. In like manner it can be seen that the voltages represented by the waveforms in FIG. 3 will produce voltage pulses at the pulse transformer secondary winding output terminals which have polarities and times of occurrence as illustrated in FIG. 4. Thus, a plurality of pulses are produced which are separated in both time and space.

The pulse transformer secondary windings of FIG. 1 may be interconnected in a variety of ways to utilize the output pulses illustrated in FIG. 4. For example, in FIG. 1 the secondary windings are connected in parallel across output terminals 100 and 102, with terminal 102 being connected to reference potential. Each of the secondary windings 42, 43, 52, 53, 62, 63, etc., includes a diode 104. With the diodes 104 included in the connection the negative pulses will be blocked and a sequence of positive pulses equally spaced 30 degrees apart will appear across output termials 100 and 102. If a similar sequence of negative pulses were desired, it would only be necessary to reverse the direction of each of the diodes 104.

Many other variations of pulse sequences are possible using the outputs of the pulse transformer secondary windings of FIG. 1. For example, if a sequence of positive pulses spaced 60 degrees apart are desired every other secondary winding is disconnected such that the parallel connection of secondary windings includes windings 42, 83, 62, 43, 82 and 63.

It will be appreciated that combinations of some or all of the secondary windings of FIG. 1 may be connected in a plurality of different ways to obtain specifically desired results, and that a description of every such combination is unnecessary to the present description.

The preceding description, and the waveforms and pulses in FIGS. 2, 3 and 4 assumed that the slidable connections B, D and F were located at the mid-points of windings 12, 22 and 32. The result was that the voltage pulses produced by the pulse transformer secondary winding were spaced every 30 degrees. The pulse to pulse spacing may be varied to provide practically any sequence of variously spaced pulses by adjusting the position of any or all of the slidable connections B, D and F.

Figure 5:
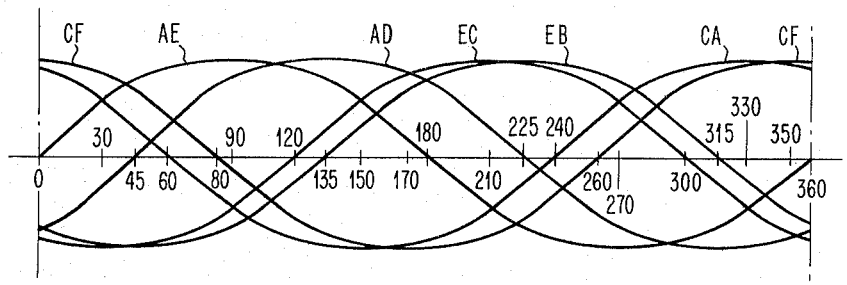
FIG. 5 is another waveform diagram of the voltage relationship between various junctions of the structure of FIG. 1.
Figure 6:
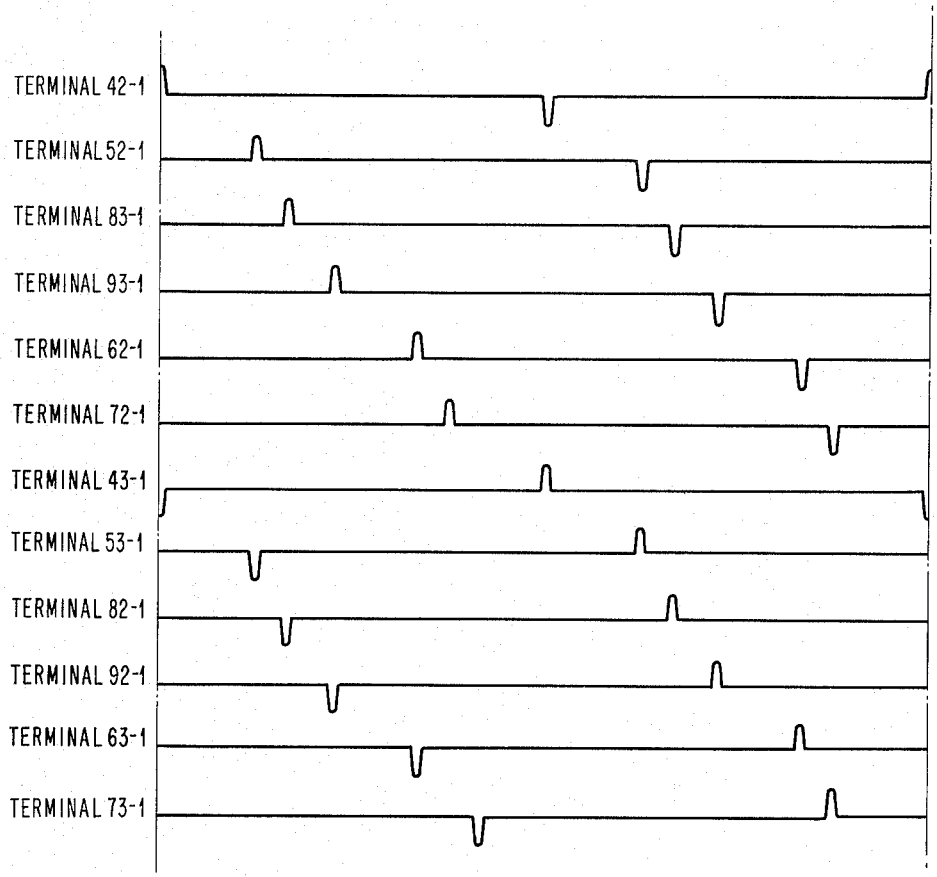
FIG. 6 is another illustration of the output pulses obtainable with the structure of FIG. 1.

For example, assume that slidable connection D is located three-fourths the length of winding 32 such that the DE portion of winding 32 is three times the length of the DC portion. Assume also that slidable connection B is located one-fourth the length of winding 12 such that the BC portion of winding 12 is one-third the length of the BA portion, and that slidable contact F is located one-third the length of winding 22 such that the FE portion of winding 22 is two times longer than the FA portion. In such instance the phases of the voltages across the primary windings 41, 51, 61, 71, 81 and 91 will be different from the phases shown in FIG. 3. The phase relationship of the voltages for the above described conditions are shown in FIG. 5. In FIG. 5 it is seen that either a positive or negative waveform polarity change occurs at 0, 45, 60, 80, 120, 135, 180, 225, 240, 260, 300, 315 and 360 degrees. The resultant pulses which occur in the various pulse transformer secondary winding output terminals 42–1, 43–1, 52–1, 53–1, etc. as a result of the waveforms of FIG. 5 are set forth in FIG. 6. It is seen that the pulse sequences of FIG. 6 differ from those of FIG. 3. This is due to the shifting of the slidable connections B, D and F of FIG. 1. It is obvious that by predetermined adjustments of slidable connections B, D and F, a great many varied pulse sequences may be produced with each of the varied possible output connections of pulse transformer secondaries 42, 43, 52, 53, 62, 63, etc.

It is to be understood that the scope of the present invention is not limited to the structure shown in FIG. 1. The primary 1 and secondary 2 of FIG. 1 provides a three phase to six phase waveform conversion. The principles of the present invention may, however, be utilized with an $n$ phase to $m$ phase structure in general.

What has been described is an apparatus for generating a sequence of pulses. The apparatus requires no moving parts for generating such pulses, and the pulse to pulse spacing and the polarity of the pulses may be varied within wide limits.

While the invention has been particularly shown and described with reference to a preferred embodiment thereof, it will be understood by those skilled in the art that various changes in form and details may be made therein without departing from the spirit and scope of the invention.

What is claimed is:
1. A pulse generator comprising:
a source of polyphase electrical signal, means responsive to said source of polyphase signal for producing a plurality of alternating potentials relatively spaced in phase,
and means responsive to said alternating potentials for producing electrical pulses when each of said alternating potentials changes polarity, said electrical pulses being relatively spaced in time in accordance with said phase spacing of said alternating potentials,
wherein said means for producing a plurality of alternating potentials includes a transformer having primary and secondary windings,
said primary windings being connected to said source of polyphase signal,
said secondary windings including a plurality of individual windings joined end to end to form a closed loop, and each of said individual windings having a movable contact thereon,
alternating potentials being manifested between said junctions of said individual windings and between said junctions and said movable contacts in response to said polyphase signal, said alternating potentials being relatively spaced in phase.
2. A pulse generator according to claim 1 wherein said means responsive to said alternating potentials for producing electrical pulses includes
a plurality of pulse transformers, first given ones of said pulse transformers being connected between said junctions of said individual windings, and other given ones of said pulse transformers being connected between said junctions and said movable contacts,
each of said pulse transformers being responsive to said alternating potentials manifested between said junctions and between said junctions and movable contacts to produce at least one electrical pulse when said alternating potentials change polarity, said pulses produced by each of said pulse transformers being relatively spaced in time in accordance with said phase spacing of said alternating potentials.
3. A pulse generator according to claim 2 wherein each of said first given ones of said pulse transformers include a core having a primary winding connected between two of said junctions of said individual windings, and at least one secondary winding on said core,
and wherein each of said other given ones of said pulse transformers include a core having a primary winding connected between a junction and a movable contact on said individual windings, and at least one secondary winding on said core.
4. A pulse generator according to claim 3 wherein each of said pulse transformers includes a first and second oppositely wound secondary winding on said core thereof, said first one of said secondary windings on each core of said pulse transformers producing a positive pulse when said alternating potential to which it is responsive changes from negative to positive polarity and a negative pulse when said alternating potential changes from positive to negative polarity, and said second one of said secondary windings on each core of said pulse transformers producing a negative pulse when said alternating potential to which it is responsive changes from negative to positive polarity and a positive pulse when said alternating potential changes from positive to negative polarity.

5. A pulse generator according to claim 4 further including means for combining said pulses produced by said pulse transformers to provide a sequence of pulses having predetermined pulse to pulse spacings.

6. A pulse generator for producing a sequence of electrical pulses comprising:
a source of polyphase electrical signal,
a transformer having three wye connected primary windings connected to said source of electrical signal, said transformer having three delta connected secondary windings,
a first three pulse transformers, each having a primary winding connected in parallel with a separate one of said delta connected transformer secondary windings,
a second three pulse transformers each having a primary winding connected between the junction of a separate two of said delta connected transformer secondary windings and a movable contact on a separate third one of said delta connected transformer secondary windings,
each of said pulse transformer primary windings producing an alternating potential, said alternating potentials being relatively spaced in phase in accordance with the location of said movable contacts on said delta connected transformer secondary windings,
each of said pulse transformers further including at least one secondary winding for producing an electrical pulse when said alternating potential in said associated primary winding thereof changes polarity.

7. A pulse transformer according to claim 6 further including means for combining the electrical pulses produced by said pulse transformer secondary windings for providing a sequence of pulses being spaced in time in accordance with said relative phase spacing of said alternating potentials.

8. A pulse generator according to claim 6 wherein each of said pulse transformers includes two oppositely wound secondary windings,
a first one of said oppositely wound windings producing a positive pulse when said alternating potential of said associated primary winding changes from negativie to positive polarity, and a negative pulse when said alternating potential changes from positive to negative polarity,
and the other one of said oppositely wound windings producing a negative pulse when said alternating potential of said associated primary winding changes from negative to positive polarity and a positive pulse when said alternating potential changes from positive to negative polarity.

9. A pulse generator for producing a sequence of electrical pulses comprising:
a source of polyphase electrical signal,
means responsive to said source of polyphase signal for producing a plurality of alternating potentials relatively spaced in phase,
and means responsive to said alternating potentials for producing electrical pulses when each of said alternating potentials changes polarity, said electrical pulses being relatively spaced in time in accordance with said phase spacing of said alternating potentials and said electrical pulses occurring on separate output leads.

10. A pulse generator according to claim 9 wherein said means for producing a plurality of alternating potentials includes a transformer having primary and secondary windings,
said primary windings being connected to said source of polyphase signal,
said secondary windings including a plurality of individual windings joined end to end to form a closed loop, and each of said individual windings having a movable contact thereon,
alternating potentials being manifested between said junctions of said individual windings and between said junctions and said movable contacts in response to said polyphase signal, said alternating potentials being relatively spaced in phase,
and wherein said means responsive to said alternating potentials for producing electrical pulses includes
a plurality of pulse transformers, first given ones of said pulse transformers being connected between said junctions of said individual windings, and other given ones of said pulse transformers being connected between said junctions and said movable contacts,
each of said pulse transformers being responsive to said alternating potentials manifested between said junctions and between said junctions and movable contacts to produce at least one electrical pulse when said alternating potentials change polarity, said pulses produced by each of said pulse transformers being relatively spaced in time in accordance with said phase spacing of said alternating potentials and said pulses occurring on separate pulse transformer output leads.

References Cited by the Examiner
UNITED STATES PATENTS 2,824,976　2/1958　Weinberg et al. _____ 321—5 X
3,075,094　1/1963　Rockafellow _____ 307—106

MILTON O. HIRSHFIELD, *Primary Examiner.*

I. J. SWARTZ, *Assistant Examiner.*